United States Patent
Cloutier Boily

(10) Patent No.: US 10,362,727 B2
(45) Date of Patent: Jul. 30, 2019

(54) FLOW CONTROL INSERT FOR AN AGRICULTURAL METERING SYSTEM

(71) Applicant: CNH Industrial Canada, Ltd., Saskatoon (CA)

(72) Inventor: Guillaume Cloutier Boily, Martensville (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 101 days.

(21) Appl. No.: 15/458,659

(22) Filed: Mar. 14, 2017

(65) Prior Publication Data

US 2018/0263176 A1    Sep. 20, 2018

(51) Int. Cl.

| A01C 7/10 | (2006.01) |
|---|---|
| A01C 5/06 | (2006.01) |
| A01C 7/04 | (2006.01) |
| A01C 7/06 | (2006.01) |
| A01C 7/08 | (2006.01) |
| A01C 7/12 | (2006.01) |
| A01C 19/02 | (2006.01) |

(52) U.S. Cl.
CPC .............. *A01C 7/102* (2013.01); *A01C 5/062* (2013.01); *A01C 5/066* (2013.01); *A01C 7/044* (2013.01); *A01C 7/06* (2013.01); *A01C 7/082* (2013.01); *A01C 7/124* (2013.01); *A01C 7/127* (2013.01); *A01C 19/02* (2013.01)

(58) Field of Classification Search
CPC .. A01C 7/102; A01C 7/10; A01C 7/08; A01C 7/00; A01C 5/062; A01C 5/06; A01C 5/00; A01C 5/066; A01C 7/044; A01C 7/042; A01C 7/04; A01C 7/06; A01C 7/082; A01C 7/081; A01C 7/127; A01C 7/12; A01C 19/02; A01C 19/00; A01C 7/124; A01C 7/123

See application file for complete search history.

(56) References Cited

U.S. PATENT DOCUMENTS

| 3,447,758 A | 6/1969 | Oznobichine |
| 3,606,965 A | 9/1971 | Cortelou et al. |
| 3,954,204 A | 5/1976 | Becker |
| 3,982,670 A | 9/1976 | Brass |
| 4,023,511 A | 5/1977 | Newman |
| 4,053,088 A | 10/1977 | Grataloup |

(Continued)

FOREIGN PATENT DOCUMENTS

| AU | 2007201262 | 4/2007 |
| WO | 2016135174 | 9/2016 |
| WO | WO2016135174 | 9/2016 |

OTHER PUBLICATIONS

1910 Tow-Behind Air Commodity Cart, Deere & Company, https://www.deere.com/en_US/products/equipment/planting_and_seeding_equipment/air_seeding/1910_commodity_air_cart/1910_commodity_air_cart.page, 2017, 3 pgs.

(Continued)

*Primary Examiner* — Christopher J. Novosad
(74) *Attorney, Agent, or Firm* — Rebecca L. Henkel; Richard K. DeMille

(57) ABSTRACT

A flow control insert for an agricultural metering system includes a body configured to couple the flow control insert to a housing of the agricultural metering system. The flow control insert also includes a shoulder extending from the body. The shoulder is configured to engage a channel in a meter roller to control flow of particulate material within the channel along a rotational direction of the meter roller.

15 Claims, 11 Drawing Sheets

(56) References Cited

U.S. PATENT DOCUMENTS

| | | |
|---|---|---|
| 4,254,897 A | 3/1981 | Stocks |
| 4,264,023 A | 4/1981 | Stocks et al. |
| 4,379,664 A | 4/1983 | Klein et al. |
| 4,453,866 A | 6/1984 | Ryan |
| 4,500,017 A | 2/1985 | Machnee |
| 4,537,333 A | 8/1985 | Bjerregaard |
| 4,600,122 A | 7/1986 | Lundie et al. |
| 4,896,616 A | 1/1990 | Wintersteiger et al. |
| 5,003,894 A | 4/1991 | Lafferty |
| 5,037,014 A | 8/1991 | Bliss |
| 5,170,909 A | 12/1992 | Lundie et al. |
| 5,314,090 A | 5/1994 | Alexander |
| 5,549,060 A | 8/1996 | Schick et al. |
| 5,601,209 A | 2/1997 | Barsi et al. |
| 5,826,523 A | 10/1998 | Gregor |
| 5,924,370 A | 7/1999 | Gregor et al. |
| 5,944,233 A | 8/1999 | Bourne |
| 5,996,515 A | 12/1999 | Gergor et al. |
| 6,158,630 A | 12/2000 | Mayerle et al. |
| 6,240,861 B1 | 6/2001 | Memory |
| 6,564,730 B2 | 5/2003 | Crabb et al. |
| 6,581,535 B2 | 6/2003 | Barry et al. |
| 6,598,548 B2 | 7/2003 | Lempriere |
| 7,083,069 B2 | 8/2006 | Wysong et al. |
| 7,100,522 B2 | 9/2006 | Mayerle |
| 7,380,733 B2 | 6/2008 | Owenby et al. |
| 7,428,874 B2 | 9/2008 | Jones et al. |
| 7,810,580 B2 | 10/2010 | Swanson |
| 7,849,806 B2 | 12/2010 | Wendte |
| 7,854,206 B2 | 12/2010 | Horsch |
| 8,166,895 B2 | 5/2012 | Dean et al. |
| 8,196,534 B2 | 6/2012 | Meyer et al. |
| 8,434,416 B2 | 5/2013 | Kowalchuk et al. |
| 8,511,242 B2 | 8/2013 | Applegate et al. |
| 8,617,630 B2 | 12/2013 | Swenson et al. |
| 8,671,857 B2 | 3/2014 | Kowalchuk et al. |
| 8,701,576 B2 | 4/2014 | Friggstad |
| 8,925,471 B2 | 1/2015 | Adams et al. |
| 8,985,396 B2 | 3/2015 | Jersey et al. |
| 9,144,190 B2 | 9/2015 | Henry et al. |
| 9,254,052 B2 | 2/2016 | Villarreal |
| 9,265,188 B2 | 2/2016 | Thompson et al. |
| 9,392,741 B2 | 7/2016 | Kowalchuk et al. |
| 9,420,738 B2 | 8/2016 | Walter |
| 9,516,805 B2 | 12/2016 | Henry et al. |
| 2012/0031315 A1 | 2/2012 | Beaujot |
| 2012/0325131 A1 | 12/2012 | Thompson et al. |
| 2015/0163990 A1 | 6/2015 | Audigie et al. |
| 2016/0120111 A1 | 5/2016 | Gervais et al. |
| 2016/0120113 A1 | 5/2016 | Kowalchuk et al. |

OTHER PUBLICATIONS

Case IH Announces Revolutionary, New 2000 Series Early Riser® Planter, Nov. 23, 2015, 4 pgs.

Abati Titanium, Abati Agriculture Machinery, https://www.caseih.com/apac/en-int/products/planting-seeding/precision-air-carts, accessed Feb. 14, 2017, 5pgs.

How to Change Meter Rollers, John Deere, OMA85532: 1910 Commodity Air Cart, http://manuals.deere.com/omview/OMA85532_19/OUO6076_0000203_19_08JUN07_1.htm, Jun. 8, 2007, 6 pgs.

Chapter 6 Seeders for 2 and 4-Wheel Tractors, tcp/cpr/2907-3101; chap6a, http://www.fao.org/Ag/agp/agpc/doc/tibetmanual/06A.2_rotary_seeddrill.htm, last visited Feb. 9, 2017, 10 pgs.

U.S. Appl. No. 15/458,607, filed Mar. 14, 2017, Guillaume Cloutier Boily.

U.S. Appl. No. 15/454,982, filed Mar. 9, 2017, Guillaume Cloutier Boily.

U.S. Appl. No. 15/456,290, filed Mar. 10, 2017, Guillaume Cloutier Boily.

U.S. Appl. No. 15/455,002, filed Mar. 9, 2017, Guillaume Cloutier Boily.

U.S. Appl. No. 15/455,019, filed Mar. 9, 2017, Guillaume Cloutier Boily.

U.S. Appl. No. 29/596,843, filed Mar. 10, 2017, Guillaume Cloutier Boily.

U.S. Appl. No. 29/596,652, filed Mar. 9, 2017, Guillaume Cloutier Boily.

U.S. Appl. No. 29/596,846, filed Mar. 10, 2017, Guillaume Cloutier Boily.

"Air-Seeding Equipment," John Deere, 2015, 40 pgs (see, e.g., p. 31).

FLOW CONTROL INSERT FOR AN AGRICULTURAL METERING SYSTEM

BACKGROUND

The disclosure relates generally to a flow control insert for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a desired volume of product into an air flow generated by the air source. The air flow carries the product to the row units via conduits extending between the air cart and the seeding implement. The metering system typically includes meter rollers that regulate the flow of product based on meter roller geometry and rotation rate.

To calibrate the meter rollers, at least one meter roller is driven to rotate through a selected number of rotations. The product output by the meter roller is then weighed, and the weight is compared to the number of meter roller rotations to establish a calibration. The calibration is used during seeding operations to control the amount of product distributed across the field (e.g., to apply the product at a target application rate). Unfortunately, during operation of the metering system, air (e.g., from the pressurized tank) may drive the product to bypass the meter roller. For example, the air may drive the product to bypass the meter roller along the direction of rotation of the meter roller (e.g., blow-by), and/or the air may drive the product to bypass the meter roller along a circumferential direction opposite the direction of rotation of the meter roller (e.g., blow-over). Accordingly, the actual product application rate may be greater than the target application rate, thereby reducing the efficiency of seeding operations.

BRIEF DESCRIPTION

In one embodiment, a flow control insert for an agricultural metering system includes a body configured to couple the flow control insert to a housing of the agricultural metering system. The flow control insert also includes a shoulder extending from the body. The shoulder is configured to engage a channel in a meter roller to control flow of particulate material within the channel along a rotational direction of the meter roller.

In another embodiment, a meter roller cartridge for an agricultural metering system includes a housing configured to house a meter roller. The housing is configured to selectively engage a meter box of the agricultural metering system, to support the meter roller within the meter box while the housing is engaged with the meter box, and to selectively disengage the meter box. The meter roller cartridge also includes a flow control insert coupled to the housing and positioned radially outward from flutes of the meter roller. The flow control insert is configured to establish a radial gap between the flow control insert and the flutes of the meter roller to control flow of particulate material along a direction of rotation of the meter roller.

In a further embodiment, a meter roller cartridge for an agricultural metering system includes a housing configured to house a meter roller. The meter roller cartridge also includes a flow control insert having a body and a shoulder extending from the body. The body is coupled to the housing, and the shoulder is configured to engage a channel in the meter roller to control flow of particulate material within the channel along a rotational direction of the meter roller.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
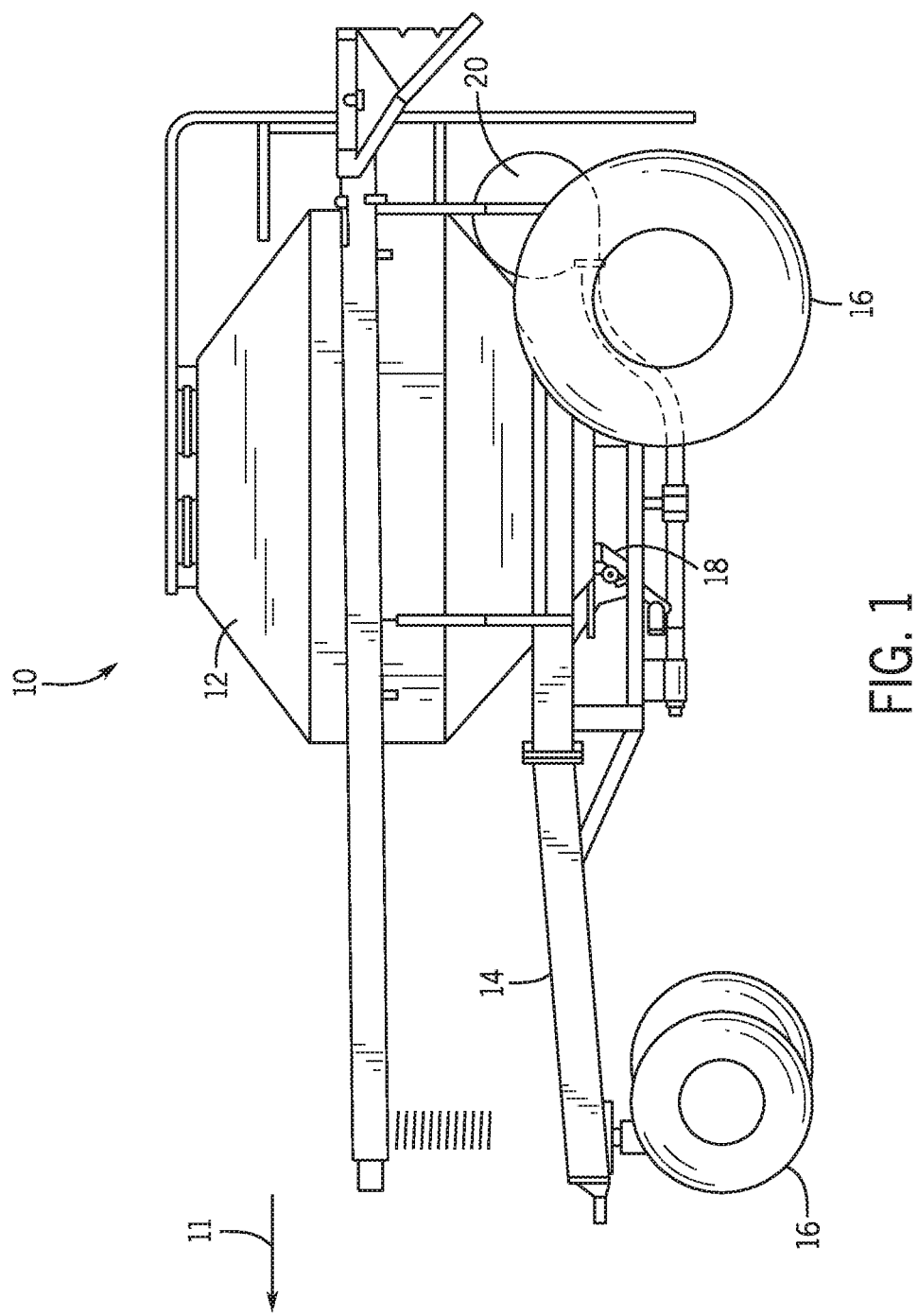
FIG. 1 is a side view of an embodiment of an air cart, including a metering system configured to regulate a flow of particulate material.

Turning now to the drawings, FIG. 1 is a side view of an air cart 10 that may be used in conjunction with a towable agricultural implement to deposit seeds into soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement along a direction of travel 11 (e.g., behind the implement or in front of the implement). In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials (e.g. products). For example, one compartment may include seeds, such as canola or mustard, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
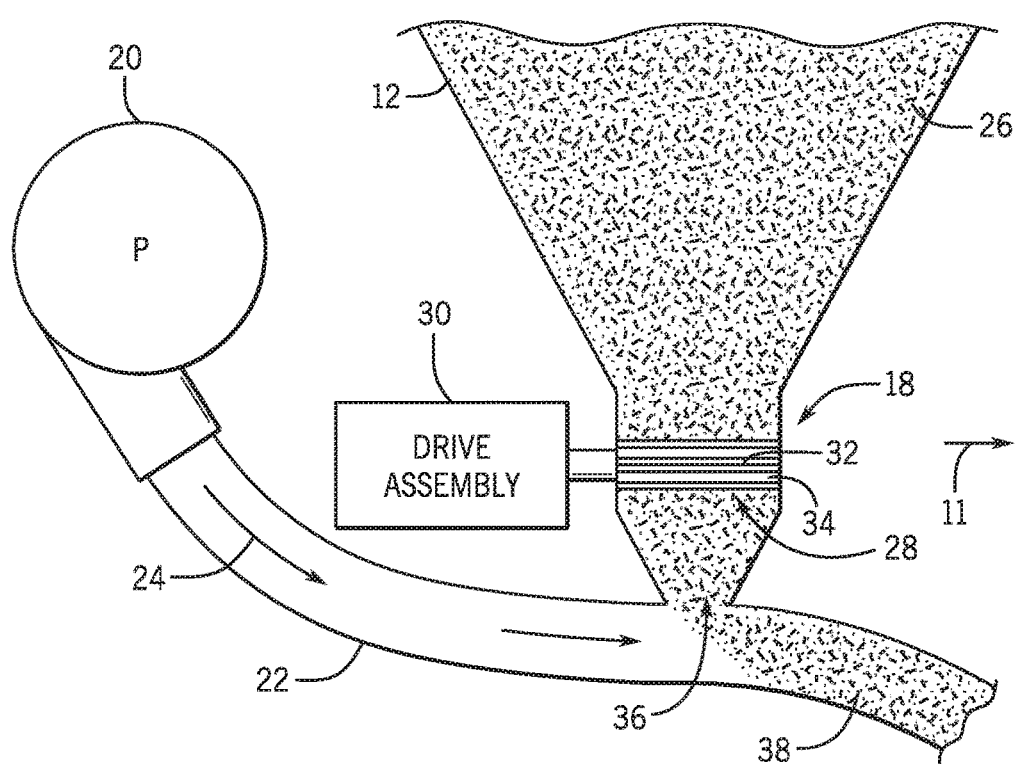
FIG. 2 is a schematic view of an embodiment of a metering system that may be employed within the air cart of FIG. 1.

FIG. 2 is a schematic view of the metering system 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, other products, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of material through the metering system 18. The metering system 18 includes one or more meter rollers 28 configured to regulate the flow of material 26 into the air flow 24. In certain embodiments, the metering system 18 may include multiple meter rollers 28 (e.g., housed within individual meter boxes) disposed adjacent to one another. In addition, certain metering systems 18 may include twelve meter rollers 28, each housed within an individual meter box and each configured to flow particulate material into a respective conduit 22 (e.g., of a material distribution system) for distribution to one or more respective row units of the agricultural implement. However, in alternative embodiments, the metering system 18 may include more or fewer meter rollers, e.g., 1, 2, 3, 4, 5, 6, 7, 8, 9, 10, 11, 13, or more. By independently adjusting the rotation speed of each meter roller, product flow to different portions of the implement may be particularly controlled.

In the illustrated embodiment, the meter roller 28 is coupled to a drive assembly 30 configured to drive the meter roller 28 to rotate. In certain embodiments, the drive assembly 30 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. In further embodiments, the drive assembly 30 may be coupled to a wheel (e.g., via a gear assembly) such that rotation of the wheel drives the meter roller 28 to rotate. Such a configuration automatically varies the rotation rate of the meter roller 28 based on the speed of the air cart.

The meter roller 28 also includes protrusions, such as the illustrated flutes 32, and recesses 34. Each respective recess 34 is disposed between a respective pair of flutes 32. As the meter roller 28 rotates, the respective pair of flutes 32 moves the material 26 (e.g., agricultural product) disposed within the respective recess 34 downwardly, thereby transferring the material 26 to the conduit 22. The number and geometry of the flutes 32 are particularly configured to accommodate the material 26 being distributed. Certain meter rollers 28 may include six flutes 32 and a corresponding number of recesses 34. Alternative meter rollers may include more or fewer flutes 32 and/or recesses 34. For example, the meter roller 28 may include 1, 2, 3, 4, 5, 6, 7, 8, 9, 10, 11, 12, 13, 14, 15, 16, 17, 18, 19, 20, or more flutes 32 and/or recesses 34. In addition, the depth of the recesses 34 and/or the height of the flutes 32 are configured to accommodate the material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26. While the illustrated meter roller includes flutes, it should be appreciated that in alternative embodiments, the meter roller may include other protrusions, and/or the recesses may be omitted.

In the illustrated embodiment, the rotationally axis of the meter roller 28 is oriented substantially parallel to the direction of travel 11 of the air cart. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration/profile, the rotation rate of the meter roller 28 controls the flow of material 26 into the air flow 24. For example, as the meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduit(s), where the seeds and/or fertilizer are deposited within the soil.

Different flowable particulate materials may include particles of different sizes. For example, seeds, such as sunflower, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of flowable particulate material being dispensed. For example, the target flow rate of certain seeds or fertilizers may be higher than the target flow rate of other seeds or fertilizers. Accordingly, certain embodiments of the metering system disclosed herein may facilitate removal and replacement of meter rollers, thereby enabling an operator to select a meter roller suitable for a particular flowable particulate material and for a target dispensing rate (e.g., a target rate for particular field conditions, climate, expected yield, etc.).

Figure 3:
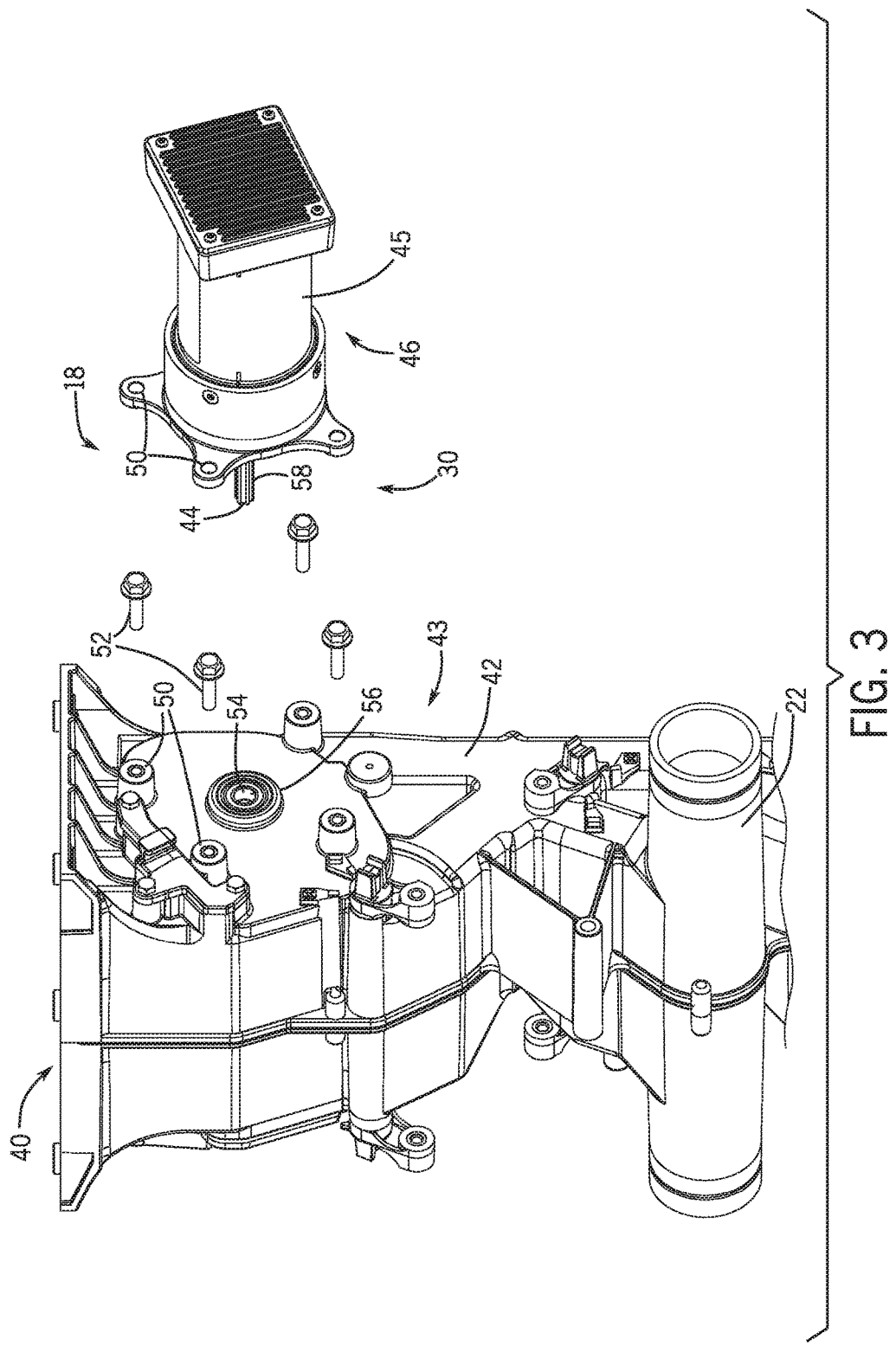
FIG. 3 is an exploded perspective view of an embodiment of a metering system that may be employed within the air cart of FIG. 1.

FIG. 3 is an exploded perspective view of an embodiment of a metering system 18 that may be employed within the air cart of FIG. 1. The metering system 18 includes a meter box 40 and a drive assembly 30. The meter box 40 has a passage 42 configured to direct the flowable particulate material to the conduit 22 for transfer to a row unit or group of row units. As shown in FIG. 3, the meter box 40 has a first side 43 (e.g., drive side) for receiving a drive unit 46 of the drive assembly 30. In the illustrated embodiment, the drive unit 46 includes a drive shaft 44 and a motor (e.g., electric motor) 45 that drives the drive shaft to rotate in a clockwise or counter-clockwise direction. The drive unit 46 and the meter box 40 include apertures 50 configured to receive fasteners (e.g., bolts) 52 to secure the drive unit 46 to the meter box 40. The drive shaft 44 is inserted into an opening 54 in the meter box such that the drive shaft 44 engages the meter roller within the meter box 40. The drive shaft 44 is configured to drive the meter roller to rotate. A bearing (e.g., ball bearing) 56 facilitates rotation of the drive shaft 44 and meter roller within the meter box 40. As the conduit 22 transfers air under the passage 42, the motor (e.g., electric motor) of the drive unit 46 drives the drive shaft 44 to rotate the meter roller. As the meter roller rotates, the meter roller dispenses flowable particulate material via the passage 42 to the air flow within the conduit 22 to form the air/material mixture. Further, pressurized air from the tank may flow through the passage 42 with the material from the meter roller.

In the illustrated embodiment, the drive shaft 44 includes a first engagement feature 58, such as protrusions, configured to non-rotatably couple the drive shaft 44 to the meter roller. The protrusions may engage corresponding recesses of the meter roller, thereby non-rotatably coupling the drive shaft 44 to the meter roller. While the drive unit 46 includes an electric motor in the illustrated embodiment, it should be appreciated that in alternative embodiments, the drive unit may include any other suitable system configured to drive rotation of the meter roller, such as a hydraulic motor, a pneumatic motor, or a gear assembly coupled to a wheel of the air cart.

Figure 4:
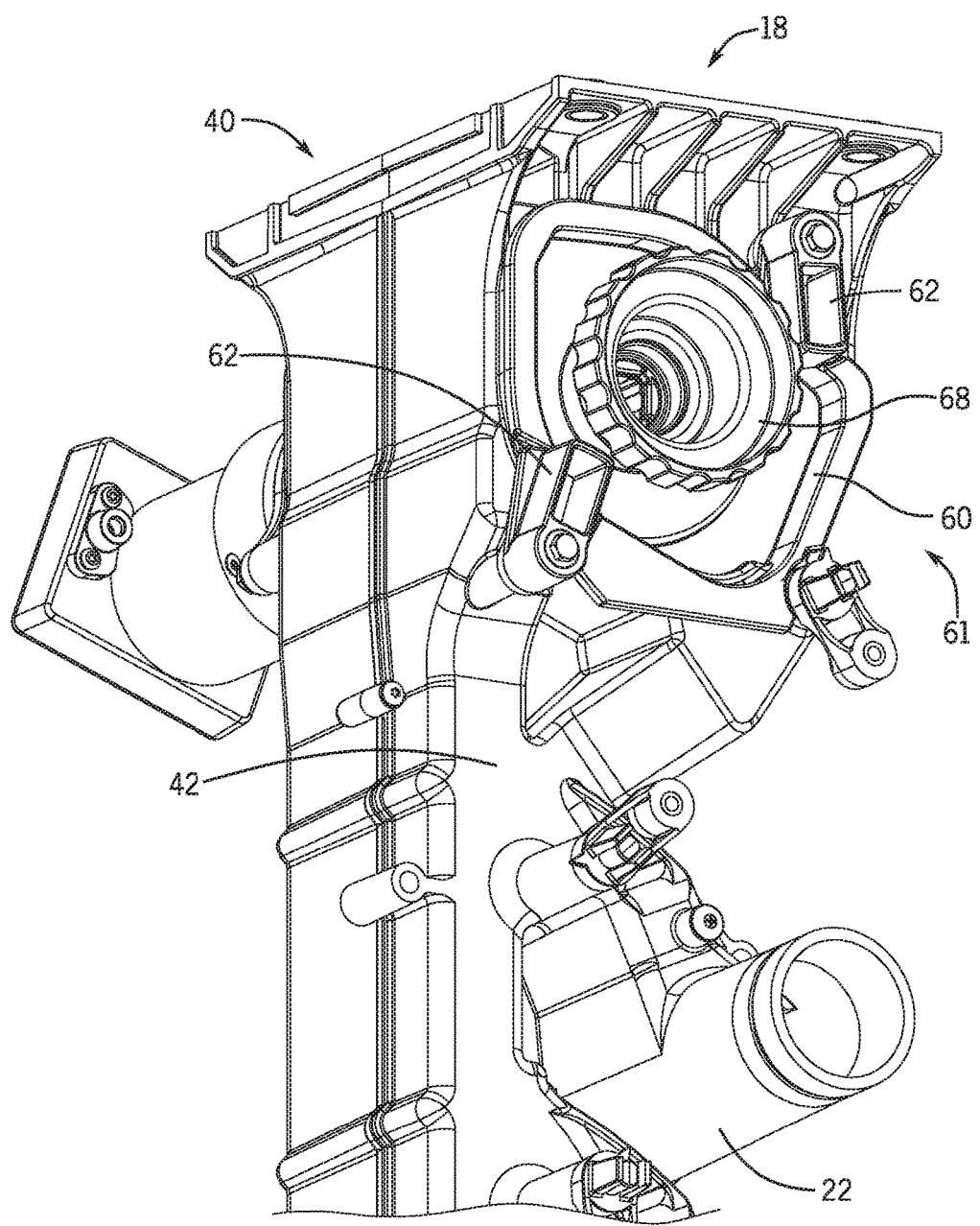
FIG. 4 is a perspective view of the metering system of FIG. 3, in which a cartridge is disposed within a meter box.

FIG. 4 is a perspective view of the metering system 18 of FIG. 3, in which a cartridge 60 is disposed within the meter box 40. As discussed in detail below, the cartridge 60 (e.g., meter roller cartridge, modular meter roller cartridge) is configured to facilitate removal and installation of the meter roller via a meter box opening on a second side 61 (e.g., cartridge side) of the meter box 40. As illustrated, the meter box 40 houses the cartridge 60 while the cartridge is disposed within the opening. While the cartridge 60 is housed within the meter box 40 of the metering system 18 in the illustrated embodiment, it should be appreciated that in alternative embodiments, the meter box may house a meter roller without a cartridge, or the meter box may house multiple cartridges (e.g., 2, 3, 4, 5, 6, or more).

In the illustrated embodiment, the metering system 18 is configured to enable the cartridge 60 to engage the meter box 40 via the meter box opening in the second side 61 (e.g., cartridge side) of the meter box 40. While the cartridge 60 is engaged with the meter box 40, the shaft of the drive unit engages the meter roller, thereby enabling the meter roller to be driven in rotation. The cartridge 60 has a cross-sectional shape that substantially corresponds to the cross-sectional shape of the meter box opening. As illustrated, the meter box 40 includes two cartridge locking tabs 62 configured to selectively block removal of the cartridge 60 from the meter box 40, thereby retaining the cartridge 60 within the meter box 40. In the illustrated embodiment, each locking tab 62 is part of a rotatable latch configured to rotate between the illustrated locked position that blocks removal of the cartridge 60 from the meter box 40 and an unlocked position that facilitates removal of the cartridge 60 from the meter box 40. In certain embodiments, each cartridge locking tab includes a recess that engages a corresponding notch on the cartridge 60 to block unintentional rotation of the rotatable latch while the rotatable latch is in the locked position (e.g., due to vibrations of the air cart). The cartridge 60 may be removed by rotating each rotatable latch in a respective first direction and extracting the cartridge 60. Further, the cartridge 60 may be inserted by engaging the cartridge with the meter box 40, and then rotating each latch in a respective second direction, opposite the respective first direction. While each cartridge locking tab 62 is part of a rotatable latch in the illustrated embodiment, it should be appreciated that in alternative embodiments, the cartridge locking tab may be part of a spring latch, a bolt latch, or any suitable type of locking mechanism. Furthermore, while the illustrated meter box includes two locking tabs, it should be appreciated that in alternative embodiments, the meter box may include more or fewer locking tabs (e.g., 1, 2, 3, 4, etc.). In the illustrated embodiment, the cartridge 60 includes a releasable bearing coupler 68. As discussed in detail below, the releasable bearing coupler 68 retains the meter roller within the cartridge, facilitates rotation of the meter roller within the cartridge, and facilitates removal of the meter roller from the cartridge.

Figure 5:
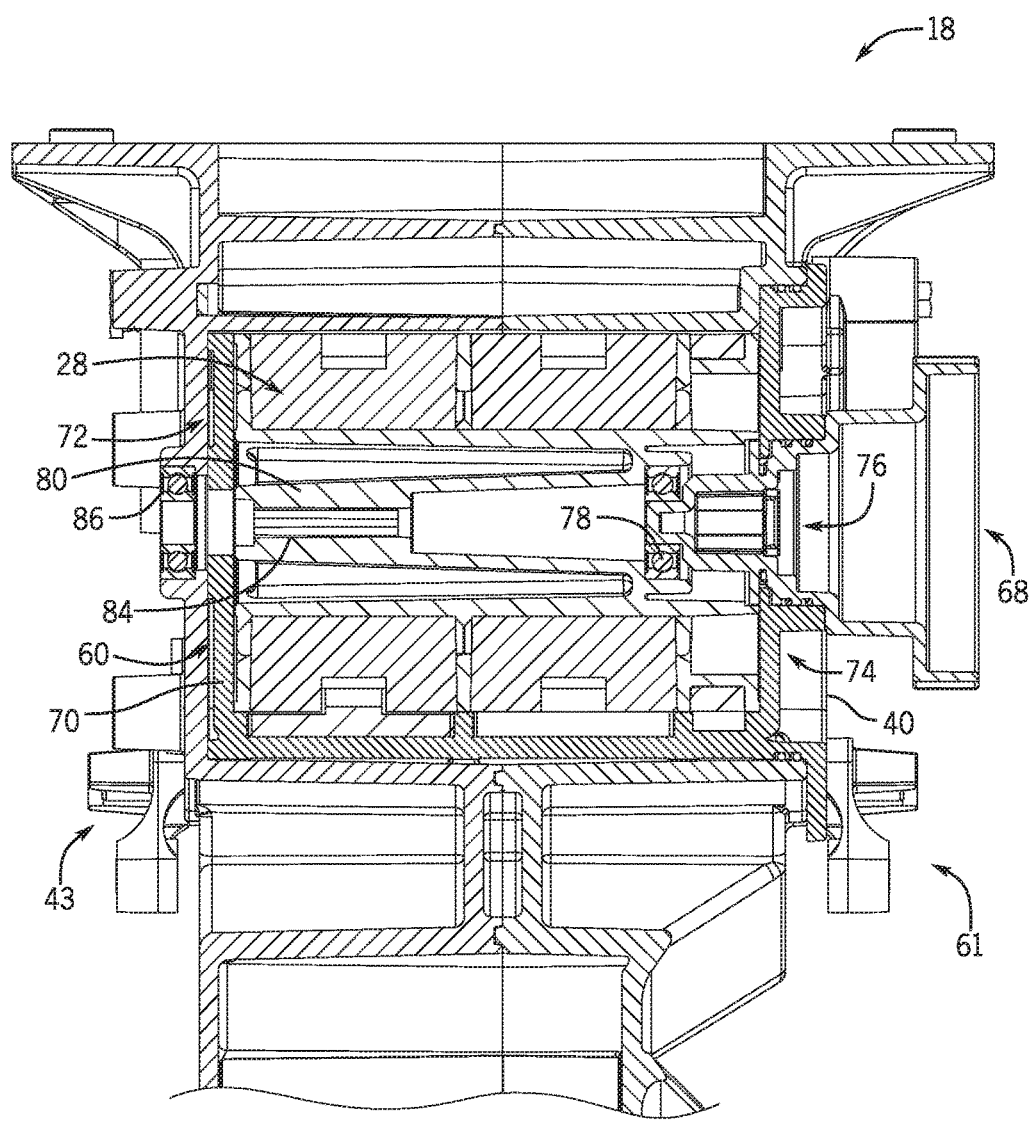
FIG. 5 is a cross-sectional view of the metering system of FIG. 3.

FIG. 5 is a cross-sectional view of the metering system 18 of FIG. 3. As illustrated, the cartridge 60 is engaged with/disposed within the meter box 40 of the metering system 18. The cartridge 60 includes a housing 70 configured to rotatably support the meter roller 28 within the meter box 40 (e.g., the housing 70 is secured to the meter box while the meter roller 28 rotates). The housing 70 includes a first side 72 (e.g., cartridge drive side) and a second side 74 (e.g., cartridge bearing side), which correspond to the first side 43 and second side 61 of the meter box 40, respectively.

The cartridge 60 includes a bearing opening 76 for receiving the releasable bearing coupler 68, and in certain embodiments, a meter roller bearing 78, which may engage the meter roller 28. The meter roller 28 includes a driven shaft 80 configured to engage the drive shaft of the drive unit, thereby non-rotatably coupling the drive shaft to the meter roller. The driven shaft 80 includes a second engagement feature 84 (e.g., recesses) configured to selectively engage the first engagement feature (e.g., protrusions) of the drive shaft. The driven shaft may be an integral part of a meter roller spindle, and the flutes and recesses of the meter roller may be formed on one or more meter roller inserts non-rotatably coupled to the spindle. While the second engagement feature includes recesses in the illustrated embodiment, it should be appreciated that in alternative embodiments, the second engagement feature may include a cavity having a polygonal cross-section and configured to engage the drive shaft having a corresponding polygonal cross-section (e.g., first engagement feature). Furthermore, while the illustrated second engagement feature 84 facilities shape-based engagement with the first engagement feature, it should be appreciated that in alternative embodiments, any variety of suitable interlocking mechanisms may be utilized for non-rotatably coupling the meter roller to the drive shaft.

In the illustrated embodiment, a drive bearing 86 is used to facilitate rotation of the drive shaft within the meter box. The drive bearing 86, the driven shaft 80, the drive shaft, and the meter roller bearing 78 associated with the releasable bearing coupler 68 are in longitudinal alignment, thereby facilitating rotation of the meter roller 28 in response to rotation of the drive shaft. The meter roller bearing 78 may be coupled to the releasable bearing coupler 68, the driven shaft 80, or it may be a separate individual element. While the cartridge 60 is engaged with/disposed within the meter box 40, the housing 70 rotatably supports/houses the meter roller 28. To change a meter roller 28, the operator may remove the cartridge 60, replace the meter roller 28, and then reinstall the cartridge 60. Alternatively, the operator may remove the cartridge 60 and replace the cartridge with another cartridge that contains a different meter roller or with a different cartridge type.

Figure 6:
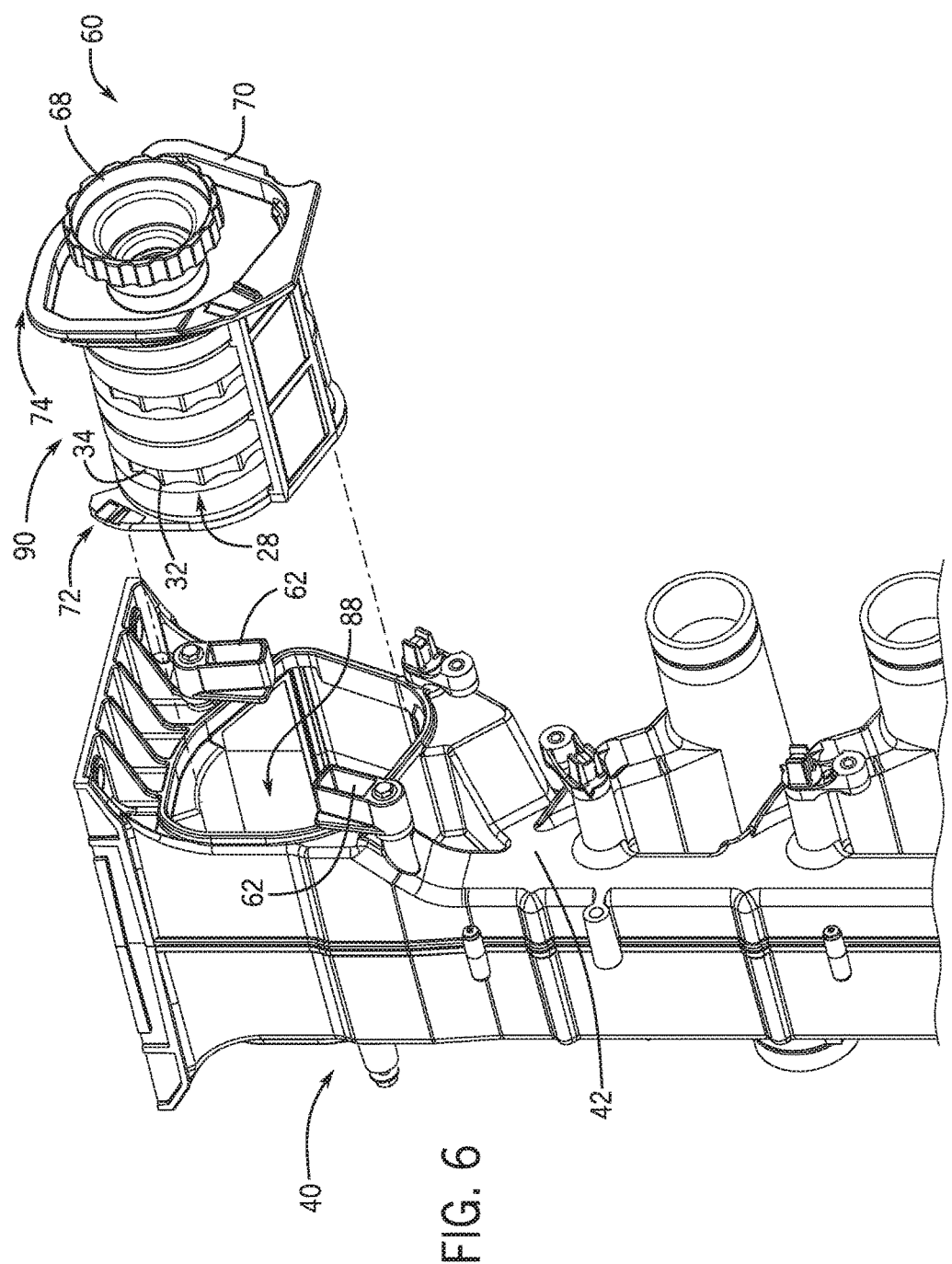
FIG. 6 is a perspective view of the metering system of FIG. 3, in which the cartridge is removed from the meter box.

FIG. 6 is a perspective view of the metering system of FIG. 3, in which the cartridge 60 is removed from the meter box 40. To remove the cartridge 60, the operator may rotate the rotatable latches to the unlocked position, in which the locking tabs 62 are positioned to facilitate removal of the cartridge, and extract the cartridge 60 from the meter box 40. As illustrated, the cross-sectional shape of the cartridge 60 (e.g., the cross-sectional shape of the first side 72, the cross-sectional shape of the second side 74, etc.) substantially correspond to the cross-sectional shape of the meter box opening 88.

As illustrated, the meter roller 28 includes flutes 32 and recesses 34, which are configured to enable the meter roller 28 to control the flow of the flowable particulate material into the passage 42. The meter roller 28 is rotatably supported on the second side 74 of the meter roller cartridge 60 by the releasable bearing coupler 68. Once the cartridge 60 is removed from the meter box 40, the releasable bearing coupler 68 may be disengaged and removed from the meter roller/housing. Once the rotatable bearing coupler 68 is removed, the meter roller 28 may be removed through an opening 90, thereby enabling insertion of another meter roller (e.g., suitable for use with material having a larger or small particle size, and/or for a higher or lower target application rate).

Figure 7:
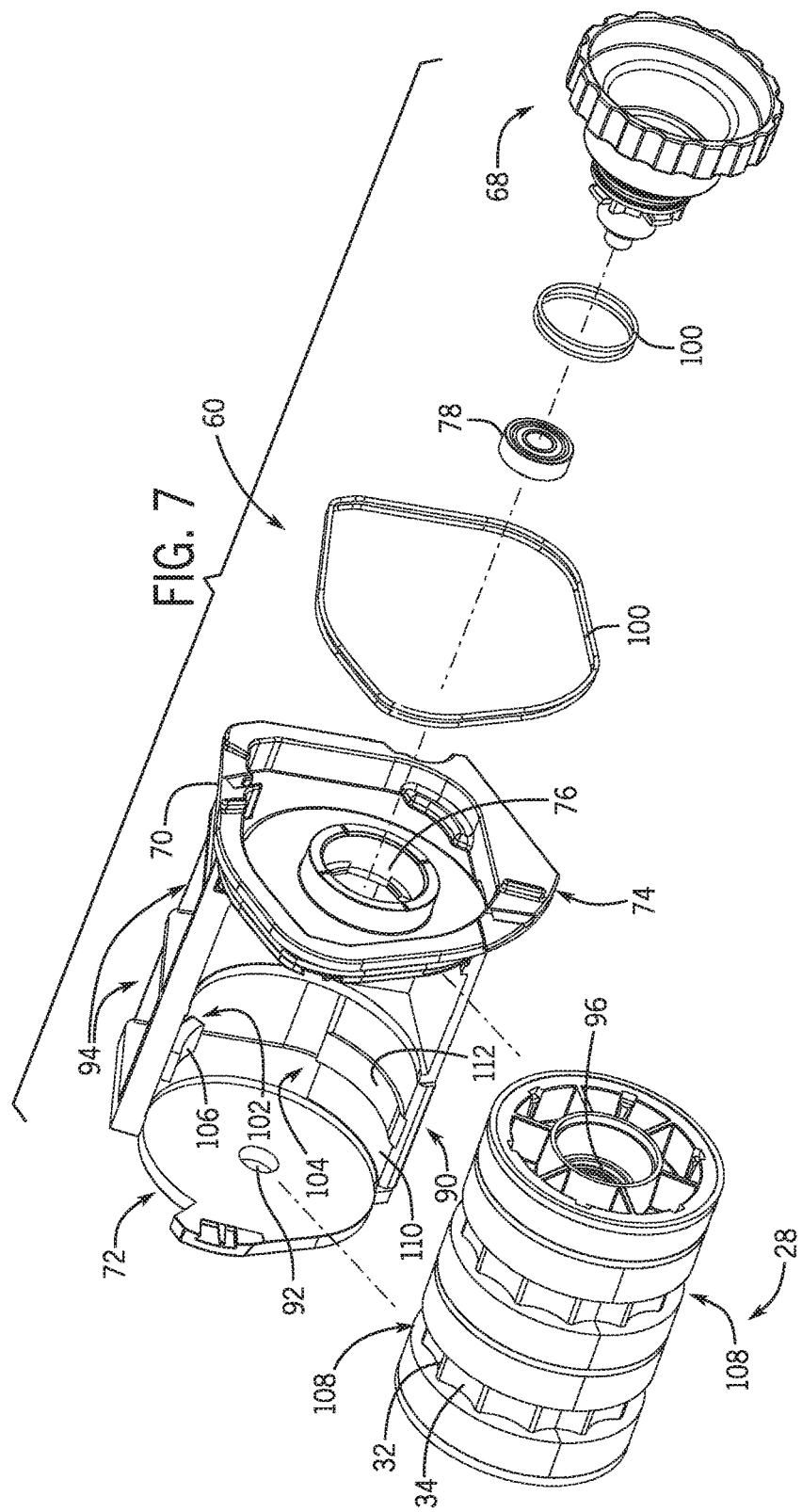
FIG. 7 is an exploded perspective view of the cartridge of FIG. 4, in which a meter roller is removed from a housing of the cartridge.

FIG. 7 is an exploded perspective view of the cartridge 60 of FIG. 4, in which the meter roller 28 is removed from the housing 70 of the cartridge 60. The housing 70 of the cartridge 60 has a drive shaft opening 92 on the first side 72 of the housing 70 and the bearing opening 76 on the second side 74 of the housing 70. The housing 70 also has the meter roller opening 90 and material receiving openings 94. The material receiving openings 94 are configured to receive the flowable particulate material into the housing 70, thereby enabling the meter roller 28 to receive the material.

To couple the meter roller 28 to the housing 70, the meter roller 28 is disposed within the housing 70 through the meter roller opening 90. While the meter roller 28 is disposed within the housing 70, the drive shaft opening 92 on the first side 72 of the housing 70 aligns with the drive shaft opening (e.g., a recess or interior cavity) of the driven shaft. In addition, the bearing opening 76 on the second side 74 of the housing 70 aligns with a bearing opening 96 (e.g., a recess or interior cavity) of the meter roller 28. The bearing opening 96 may be configured to receive the bearing 78 or the bearing may be fixedly mounted within the opening 96. The openings of the meter roller 28 and cartridge 60 are longitudinally aligned with one another and with the drive shaft.

The meter roller cartridge 60 and/or the releasable bearing coupler 68 may include gaskets 100. While two gaskets 100 (e.g., O-rings) are included in the illustrated embodiment, it should be appreciated that in alternative embodiments, any suitable number of gaskets (e.g., O-rings) may be used to seal adjacent parts. Once the meter roller 28 is disposed within the housing 70, the bearing opening 96 may receive the releasable bearing coupler 68, and in certain embodiments the meter roller bearing 78, via the bearing opening 76 in the housing 70. The meter roller bearing 78 may be fixedly coupled to the meter roller 28 or fixedly coupled to the releasable bearing coupler 68 in certain embodiments. In further embodiments, the meter roller bearing 78 may be an independent element. The releasable bearing coupler 68 may include the bearing 78, or the releasable bearing coupler 68 may be configured to engage the bearing 78 with a shaft of the releasable bearing coupler 68. Accordingly, the bearing 78 may be configured to engage the opening 96 of the meter roller 28 to facilitate rotation of the meter roller 28 relative to the housing 70 (e.g., rotation about the shaft of the releasable bearing coupler). The bearing coupler 68 is configured to engage the bearing opening 76 and to couple to the housing 70 via corresponding locking elements of the bearing coupler 68 and the housing 70. For example, the locking elements may interlock with one another via rotation of the bearing coupler 68 relative to the housing, thereby coupling the bearing coupler 68 to the housing 70. While the bearing coupler 68 is coupled to the housing 70, the shaft of the bearing coupler 68 rotatably supports the meter roller 28 and secures the meter roller to the housing 70.

In the illustrated embodiment, the meter roller cartridge 60 includes a blow-over insert 102 and a blow-by insert 104. As discussed in detail below, the blow-over insert 102 is coupled to the housing 70 (e.g., by an adhesive connection) and includes a tongue 106 configured to engage a channel 108 in the meter roller 28 to substantially block flow of the particulate material through the channel 108 in a circumferential direction opposite the rotational direction of the meter roller 28. Blocking the flow of the particulate material through the channel in the circumferential direction opposite the rotational direction substantially reduces the amount of particulate material that bypasses the meter roller, thereby enhancing the accuracy of the metering process. In addition, the blow-by insert 104 includes a body 110 and a shoulder 112 extending from the body. The body 110 is coupled to the housing 70, and the shoulder 112 is configured to engage the channel 108 in the meter roller 28 to control flow of the particulate material within the channel 108 along the rotational direction of the meter roller 28. For example, the shoulder 112 may be configured to block flow of particulate material that would otherwise bypass the meter roller (e.g., the particulate material that is not within the recesses of the meter roller). As a result, the accuracy of the metering process may be enhanced.

Figure 8:
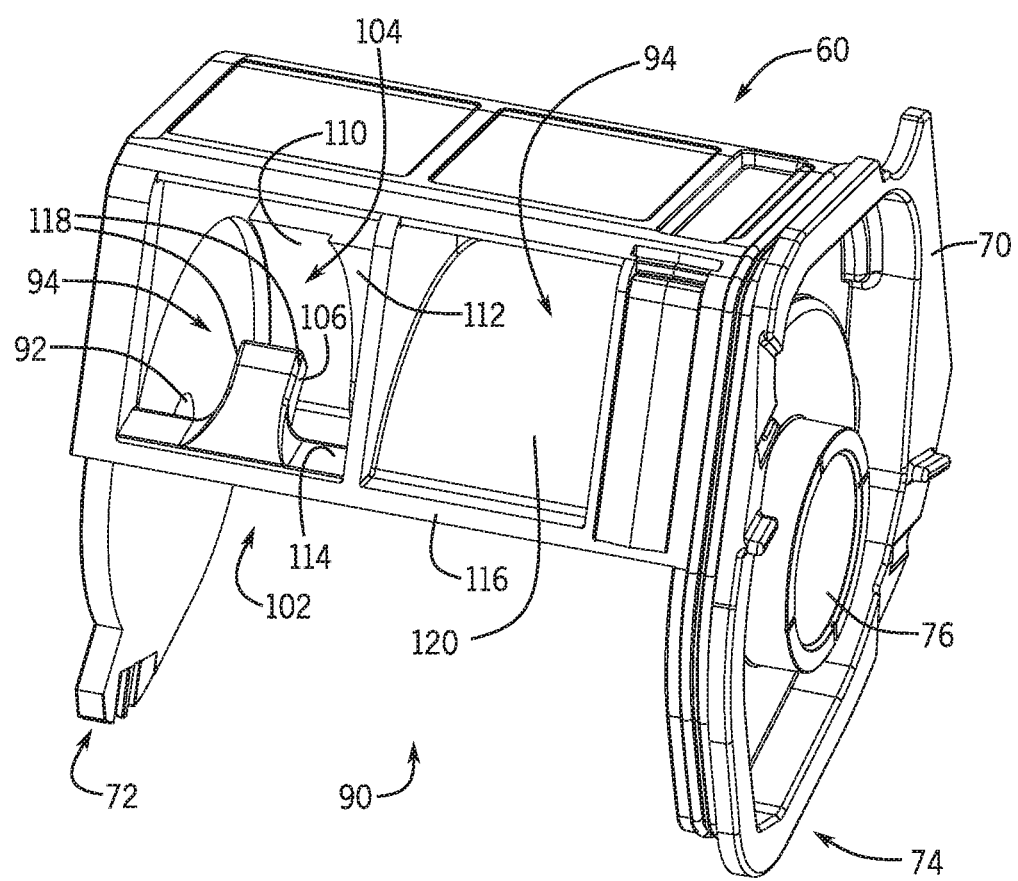
FIG. 8 is a perspective view of the housing of FIG. 7, in which a blow-over insert and a blow-by insert are coupled to the housing.

FIG. 8 is a perspective view of the housing 70 of FIG. 7, in which the blow-over insert (e.g., flow control insert) 102 and the blow-by insert (e.g., flow control insert) 104 are coupled to the housing 70. In the illustrated embodiment, the blow-over insert 102 includes a head 114 and the tongue 106. The head 114 is coupled to a top brace 116 of the housing 70 (e.g., by an adhesive connection). In addition, the tongue 106, which extends from the head 114, is configured to engage the channel in the meter roller to substantially block flow of the particulate material in the circumferential direction opposite the rotational direction of the meter roller, thereby increasing the accuracy of the metering process. In the illustrated embodiment, the tongue 106 of the blow-over insert 102 includes multiple rounded corners 118 to facilitate flow of the particulate material around the tongue 106 from the material receiving opening 94 to the meter roller. However, it should be appreciated that in alternative embodiments, one or more of the corners may be formed at right angle(s) or have any other suitable shape.

In the illustrated embodiment, the housing 70 includes an integrated cover 120 configured to block flow of the particulate material from one material receiving opening 94 to the meter roller. Accordingly, the flowable particulate material only engages one rank (e.g., segment) of the meter roller. However, it should be appreciated that in alternative embodiments, the cover may be omitted, and the particulate material may flow through both material receiving openings to two ranks (e.g., segments) of the meter roller. In such embodiments, the meter roller cartridge may include a second blow-over insert and/or a second blow-by insert to control the flow of particulate material through the meter roller cartridge. Furthermore, in certain embodiments, the meter roller cartridge 60 may include a single blow-by insert that extends across multiple ranks (e.g., two ranks, etc.) of the meter roller. Moreover, while the meter roller includes two ranks (e.g., segments) and the housing includes two corresponding material receiving openings, it should be appreciated that in alternative embodiments, the meter roller may include more or fewer ranks (e.g., 1, 2, 3, 4, 5, 6, or more), and the housing may include a corresponding number of material receiving openings. In addition, the meter roller cartridge may include one or more flow control inserts (e.g., blow-over insert and/or blow-by insert) for each rank.

Figure 9:
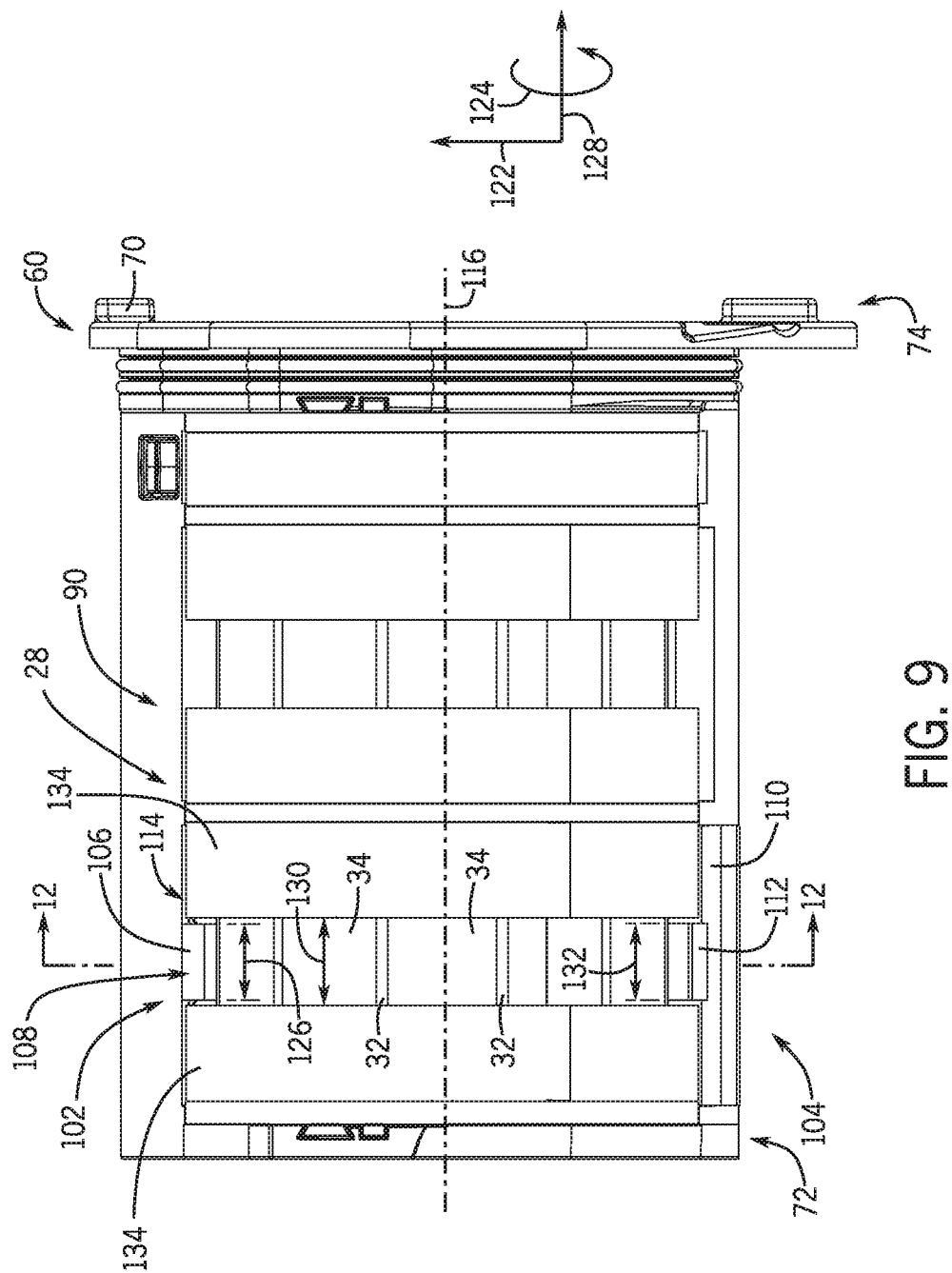
FIG. 9 is a front view of the cartridge of FIG. 4.

FIG. 9 is a front view of the cartridge 60 of FIG. 4. As illustrated, the tongue 106 of the blow-over insert 102 is engaged with the channel 108 of the meter roller 28. As discussed in detail below, a radial position of the tongue 106 (e.g., position of the tongue along a radial axis 122) may be particularly selected to establish a gap (e.g., radial gap) between the tongue 106 and the flutes 32 of the meter roller 28 to facilitate rotation of the meter roller 28 (e.g., without contact between the meter roller and the blow-over insert 102). In addition, the gap may be sufficiently small (e.g., less than the size of the particles of the particulate material) to substantially block flow of the particulate material through the channel 108 in the circumferential direction opposite the rotational direction of the meter roller 28. Furthermore, a circumferential extent of the tongue 106 (e.g., extent of the tongue along a circumferential axis 124) may be particularly selected to be greater than the circumferential offset between the flutes 32 (e.g., the distance between the flutes 32 along the circumferential axis 124). Accordingly, as the meter roller 28 rotates, at least one flute may be positioned along the circumferential extent of the tongue 106 to substantially block flow of the particulate material through the channel 108 in the circumferential direction opposite the rotational direction of the meter roller 28. In addition, a longitudinal extent 126 of the tongue 106 (e.g., extent of the tongue along a longitudinal axis 128) may be substantially equal to a longitudinal extent 130 of the channel 108 (e.g., extent of the channel along the longitudinal axis 128). As used herein, "substantially equal" refers to a difference in longitudinal extent of less than 4 mm, less than 3 mm, less than 2 mm, less than 1 mm, less than 0.5 mm, or less than 0.1 mm, in which the longitudinal extent of the channel is greater than the longitudinal extent of the tongue. For example, the spacing between each longitudinally outward side of the tongue and a corresponding longitudinally inward side of the channel may be less than the size of the particles of the particulate material. Accordingly, flow of the particulate material between the longitudinally outward sides of the tongue and the longitudinally inward sides of the channel may be substantially blocked.

As illustrated, the shoulder 112 of the blow-by insert 104 is engaged with the channel 108 of the meter roller 28. As discussed in detail below, a radial position of the shoulder 112 (e.g., position of the shoulder along the radial axis 122) may be particularly selected to establish a gap (e.g., radial gap) between the shoulder 112 and the flutes 32 of the meter roller 28 to facilitate rotation of the meter roller 28 (e.g., without contact between the meter roller and the blow-by insert 104). In addition, the gap may be sufficiently small to control flow of the particulate material within the channel 108 along the rotational direction of the meter roller 28. Furthermore, a circumferential extent of the shoulder 112 (e.g., extent of the shoulder along the circumferential axis 124) may be particularly selected to be greater than the circumferential offset between the flutes 32 (e.g., the distance between flutes 32 along the circumferential axis 124). Accordingly, as the meter roller 28 rotates, at least one flute may be positioned along the circumferential extent of the shoulder 112 to control flow of the particulate material within the channel 108 along the rotational direction of the meter roller 28. In addition, a longitudinal extent 132 of the shoulder 112 (e.g., extent of the shoulder along the longitudinal axis 128) may be substantially equal to the longitudinal extent 130 of the channel 108 (e.g., extent of the channel along the longitudinal axis 128). As used herein, "substantially equal" refers to a difference in longitudinal extent of less than 4 mm, less than 3 mm, less than 2 mm, less than 1 mm, less than 0.5 mm, or less than 0.1 mm, in which the longitudinal extent of the channel is greater than the longitudinal extent of the shoulder. For example, the spacing between each longitudinally outward side of the shoulder and a corresponding longitudinally inward side of the channel may be less than the size of the particles of the particulate material. Accordingly, flow of the particulate material between the longitudinally outward sides of the shoulder and the longitudinally inward sides of the channel may be substantially blocked.

In the illustrated embodiment, the channel 108 of the meter roller 28 is formed by annular structures 134 positioned on opposite longitudinal sides of the channel 108. The body 110 of the blow-by insert 104 may be particularly shaped to substantially match the circumferential profile of the annular structures 134. In addition, the body 110 may be shaped to establish a gap (e.g., radial gap) between the body and the annular structures 134 sufficient to facilitate rotation of the meter roller 28 (e.g., without contact between the meter roller and the blow-by insert 104). Furthermore, the gap may be sufficiently small (e.g., less than the size of the particles of the particulate material) to substantially block flow of the particulate material between the body 110 and the annular structures 134. For example, the body 110 may be configured to establish a gap of between about 0.1 mm and about 5 mm, about 0.5 mm and about 3 mm, about 1 mm and about 2 mm, or about 1 mm. By way of further example, the gap may be less than or equal to 5 mm, 4 mm, 3 mm, 2 mm, 1 mm, 0.5 mm, or 0.1 mm.

Figure 10:
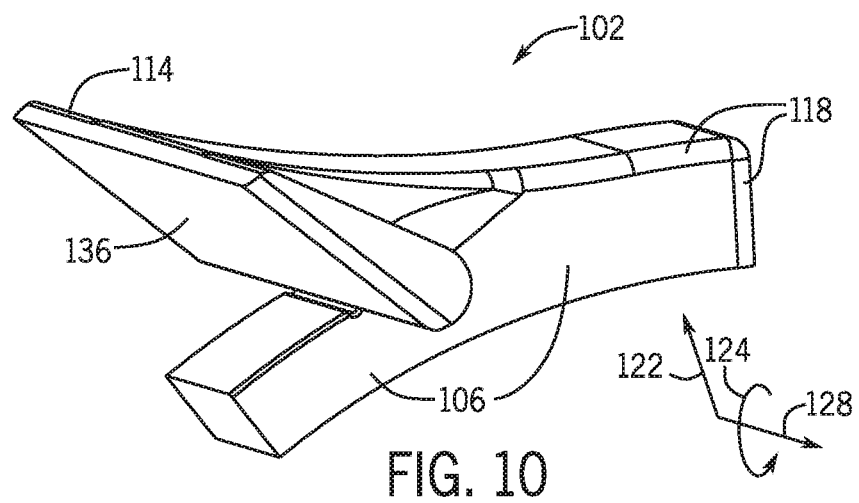
FIG. 10 is a perspective view of the blow-over insert of FIG. 8.

FIG. 10 is a perspective view of the blow-over insert 102 of FIG. 8. As previously discussed, the blow-over insert 102 includes a head 114 configured to couple the blow-over insert 102 to the housing of the meter roller cartridge. The blow-over insert 102 also includes a tongue 106 extending from the head 114. The tongue 106 is configured to engage the channel in the meter roller to substantially block flow of the particulate material through the channel in the circumferential direction opposite the rotational direction of the meter roller. In addition, the tongue 106 includes multiple rounded corners 118 to facilitate flow of the particulate material around the tongue 106 from the material receiving opening of the meter roller housing to the meter roller. In the illustrated embodiment, the head 114 has a substantially flat surface 136 configured to interface with the top brace of the meter roller housing. For example, the top brace may have a corresponding substantially flat surface, and the substantially flat surfaces may be in contact with one another. In certain embodiments, the substantially flat surface 136 of the head 114 is coupled to the top brace (e.g., the corresponding substantially flat surface of the top brace) by an adhesive connection, thereby coupling the blow-over insert 102 to the housing.

Figure 11:
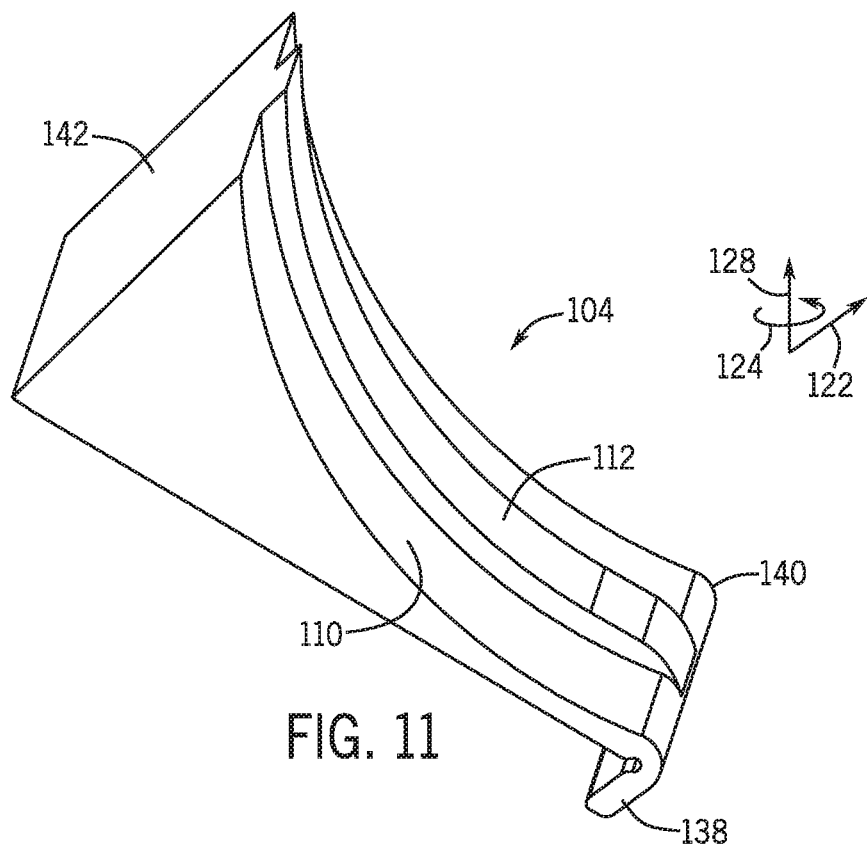
FIG. 11 is a perspective view of the blow-by insert of FIG. 8.

FIG. 11 is a perspective view of the blow-by insert 104 of FIG. 8. As previously discussed, the blow-by insert 104 includes a body 110 and a shoulder 112 extending from the body along the radial axis 122. The body 110 is configured to couple to the meter roller housing, and the shoulder 112 is configured to engage the channel in the meter roller to control flow of the particulate material within the channel along the rotational direction of the meter roller. In the illustrated embodiment, the body 110 includes a lip 138 that forms a rounded edge 140. The rounded edge 140 is positioned at a longitudinal end of the body 110 to facilitate flow of the particulate material from the meter roller to the passage of the meter box. However, it should be appreciated that in alternative embodiments, the edge at the longitudinal end of the body may have a different shape (e.g., polygonal, elliptical, etc.), and/or the lip may be omitted. In the illustrated embodiment, the body 110 has a sloped surface 142 configured to direct the particulate material toward a discharge opening of the housing, thereby substantially reducing the amount of particulate material within the housing after the discharge process is complete.

Figure 12:
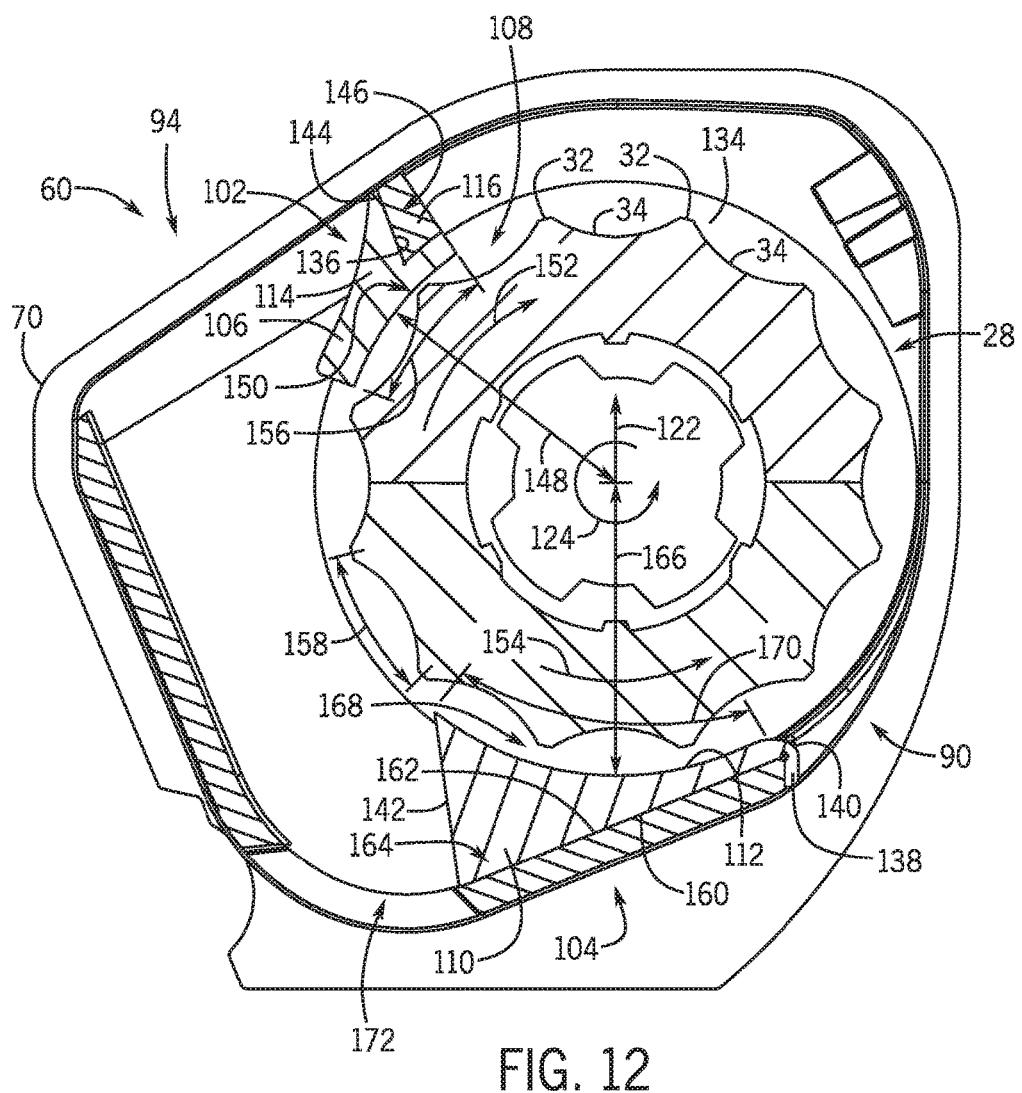
FIG. 12 is a cross-sectional view of the housing of FIG. 7, taken along line 12-12 of FIG. 9.

FIG. 12 is a cross-sectional view of the housing 70 of FIG. 7, taken along line 12-12 of FIG. 9. In the illustrated embodiment, the head 114 of the blow-over insert 102 is coupled to the top brace 116 of the meter roller housing 70. As illustrated, the substantially flat surface 136 of the head 114 is engaged with a corresponding substantially flat surface 144 of the top brace 116, and the substantially flat surfaces 136 and 144 are coupled to one another by an adhesive connection 146. Accordingly, the blow-over insert 102 is coupled to the housing 70. While the adhesive connection is positioned between the substantially flat surfaces in the illustrated embodiment, it should be appreciated that in alternative embodiments, one or more adhesive connections may be formed between other contact surfaces of the blow-over insert and the housing, such as on longitudinally outward sides of the blow-over insert and on longitudinally inward sides of the housing (e.g., in addition or as an alternative to the adhesive connection 146). Furthermore, it should be appreciated that in certain embodiments, the meter roller cartridge may include other coupling systems configured to couple the blow-over insert to the housing, such as fastener(s) or a welded connection, among other suitable connections (e.g., in addition or as an alternative to adhesive connection(s)). For example, in embodiments in which the blow-over insert is coupled to the housing by fasteners, the substantially flat surface of the head may be omitted.

In the illustrated embodiment, a radial position 148 of the tongue 106 (e.g., position of the tongue along the radial axis 122) may be particularly selected to establish a gap 150 (e.g., radial gap) between the tongue 106 and the flutes 32 of the meter roller 28 to facilitate rotation of the meter roller 28 (e.g., without contact between the meter roller and the blow-over insert 102). In addition, the gap 150 may be sufficiently small (e.g., less than the size of the particles of the particulate material) to substantially block flow of the particulate material through the channel 108 in a circumferential direction 152 opposite a rotational direction 154 of the meter roller 28. For example, in certain embodiments, the radial position 148 may be selected to establish a gap 150 of between about 0.1 mm and about 5 mm, about 0.5 mm and about 3 mm, about 1 mm and about 2 mm, or about 1 mm. By way of further example, the gap may be less than or equal to 5 mm, 4 mm, 3 mm, 2 mm, 1 mm, 0.5 mm, or 0.1 mm.

Furthermore, a circumferential extent 156 of the tongue 106 (e.g., extent of the tongue along the circumferential axis 124) may be particularly selected to be greater than the circumferential offset 158 between the flutes 32 (e.g., the distance between flutes 32 along the circumferential axis 124, which is about 30 degrees in the illustrated embodiment). Accordingly, as the meter roller 28 rotates, at least one flute may be positioned along the circumferential extent 156 of the tongue 106 to substantially block flow of the particulate material through the channel 108 in the circumferential direction 152. For example, the circumferential extent 156 of the tongue 106 may be between about 0 degrees and about 30 degrees, about 0 degrees and about 20 degrees, about 5 degrees and about 10 degrees, or about 5 degrees greater than the circumferential offset 158 between the flutes 32. By way of further example, the circumferential extent 156 of the tongue 106 may be more than 0 degrees, more than 1 degree, more than 3 degrees, more than 5 degrees, more than 10 degrees, or more than 15 degrees greater than the circumferential offset 158 between the flutes 32.

In the illustrated embodiment, the body 110 of the blow-by insert 104 is coupled to the meter roller housing 70. As illustrated, a substantially flat mounting surface 160 of the body 110 is engaged (e.g., interfaced) with a corresponding substantially flat mounting surface 162 of the housing 70, and the substantially flat surfaces 160 and 162 are coupled to one another by an adhesive connection 164. Accordingly, the blow-by insert 104 is coupled to the housing 70. While the adhesive connection is positioned between the substantially flat mounting surfaces in the illustrated embodiment, it should be appreciated that in alternative embodiments, one or more adhesive connections may be formed between other contact surfaces of the blow-by insert and the housing, such as on longitudinally outward sides of the blow-by insert and on longitudinally inward sides of the housing, and/or between an inner surface of the lip 138 and a corresponding surface of the housing (e.g., in addition or as an alternative to the adhesive connection 164). Furthermore, it should be appreciated that in certain embodiments, the meter roller cartridge may include other coupling systems configured to couple the blow-by insert to the housing, such as fastener(s) or a welded connection, among other suitable connections (e.g., in addition or as an alternative to adhesive connection (s)). For example, in embodiments in which the blow-by insert is coupled to the housing by fasteners, the substantially flat mounting surface of the body may be omitted.

In the illustrated embodiment, a radial position 166 of the shoulder 112 (e.g., position of the shoulder along the radial axis 122) may be particularly selected to establish a gap 168 (e.g., radial gap) between the shoulder 112 and the flutes 32 of the meter roller 28 to facilitate rotation of the meter roller 28 (e.g., without contact between the meter roller and the blow-by insert 104). In addition, the gap may be sufficiently small to control flow of the particulate material within the channel 108 along the rotational direction 154 of the meter roller 28. For example, in certain embodiments, the radial position 166 may be selected to establish a gap 168 of between about 0.5 mm and about 10 mm, about 1 mm and about 5 mm, about 2 mm and about 4 mm, or about 3 mm. By way of further example, the gap may be less than or equal to 10 mm, 5 mm, 3 mm, 2 mm, 1 mm, or 0.5 mm.

Furthermore, a circumferential extent 170 of the shoulder 112 (e.g., extent of the shoulder along the circumferential axis 124) may be particularly selected to be greater than the circumferential offset 158 between the flutes 32 (e.g., the distance between flutes 32 along the circumferential axis 124, which is about 30 degrees in the illustrated embodiment). Accordingly, as the meter roller 28 rotates, at least one flute may be positioned along the circumferential extent 170 of the shoulder 112 to control flow of the particulate material within the channel 108 along the rotational direction 154 of the meter roller 28. For example, the circumferential extent 170 of the shoulder 112 may be between about 0 degrees and about 60 degrees, about 0 degrees and about 50 degrees, about 5 degrees and about 35 degrees, or about 31.1 degrees greater than the circumferential offset 158 between the flutes 32. By way of further example, the circumferential extent 170 of the shoulder 112 may be more than 0 degrees, more than 3 degree, more than 5 degrees, more than 10 degrees, more than 15 degrees, or more than 30 degrees greater than the circumferential offset 158 between the flutes 32.

In the illustrated embodiment, the body 110 includes the rounded edge 140 at a longitudinal end of the body 110 to facilitate flow of the particulate material from the meter roller cartridge 60 to the passage, which is configured to direct the particulate material to the conduit for transfer to a row unit or group of row units. However, it should be appreciated that in alternative embodiments, the edge at the longitudinal end of the body may have a different shape (e.g., polygonal, elliptical, etc.). In addition, while the body 110 extends to the opening 90, it should be appreciated that in alternative embodiments, the longitudinal end of the body may be positioned at an offset (e.g., along the substantially flat mounting surface of the housing) from the opening.

In the illustrated embodiment, the housing 70 includes a discharge opening 172 configured to discharge the particulate material from the cartridge 60 (e.g., after seeding operations are complete). The discharge opening 172 is covered by a gate during seeding operations. Accordingly, particulate material entering the material receiving opening 94 flows to the meter roller 28. However, once seeding operations are complete, rotation of the meter roller 28 may be stopped, and the gate covering the discharge opening 172 may be opened. Accordingly, the particulate material remaining within the cartridge may discharge through the discharge opening 172, thereby substantially clearing the cartridge of particulate material. In the illustrated embodiment, the body 110 of the blow-by insert has a sloped surface 142 configured to direct the particulate material toward the discharge opening 172, thereby substantially reducing the amount of particulate material within the housing after the discharge process is complete.

While the meter roller cartridge described above includes both a blow-over insert and a blow-by insert, it should be appreciated that in certain embodiments, at least one of the inserts may be omitted. Furthermore, while the blow-by insert described above includes a shoulder configured to engage the channel of the meter roller, it should be appreciated that in certain embodiments, the shoulder may be omitted, and the radially inward surface of the body of the blow-by insert may be substantially smooth (e.g., curved). For example, in embodiments in which the meter roller does not include annular structures (e.g., the flutes and the recesses extend from one longitudinal end of the meter roller to the opposite longitudinal end of the meter roller), the blow-over insert may be omitted, and the blow-by insert may not include a shoulder (e.g., the radially inward surface of the body of the blow-by insert may be substantially smooth). In addition, while the flow control inserts (e.g., the blow-over insert and the blow-by insert) are described above with reference to a meter roller cartridge, it should be appreciated that the flow control inserts may be utilized in other agricultural metering systems. For example, at least one flow control insert (e.g., the blow-over insert and/or the blow-by insert) may be directly coupled to a housing of the meter box or to any other suitable housing configured to house (e.g., partially surround) the meter roller.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A flow control insert for an agricultural metering system, comprising:
a body configured to couple the flow control insert to a housing of the agricultural metering system; and
a shoulder extending from the body, wherein the shoulder is configured to engage a channel in a meter roller having flutes disposed within the channel, and a radial position of the shoulder is configured to establish a radial gap between the shoulder and the flutes sufficiently small to control flow of particulate material within the channel along a rotational direction of the meter roller.

2. The flow control insert of claim 1, wherein the radial position of the shoulder is configured to establish the radial gap of less than or equal to 5 mm.

3. The flow control insert of claim 1, wherein the body has a rounded edge at a longitudinal end of the body to facilitate flow of the particulate material from the meter roller to a passage.

4. The flow control insert of claim 1, wherein a circumferential extent of the shoulder is selected to be greater than a circumferential offset between the flutes of the meter roller.

5. The flow control insert of claim 4, wherein the circumferential extent of the shoulder is selected to be more than 30 degrees greater than the circumferential offset between the flutes of the meter roller.

6. The flow control insert of claim 1, wherein the body has a substantially flat mounting surface configured to interface with a corresponding substantially flat mounting surface of the housing.

7. The flow control insert of claim 1, wherein the body has a sloped surface configured to direct the particulate material toward a discharge opening in the housing.

8. The flow control insert of claim 1, wherein the shoulder has an arcuate shape configured to follow the channel along a circumferential axis.

9. A meter roller cartridge for an agricultural metering system, comprising:
a housing configured to house a meter roller; and
a flow control insert comprising a body and a shoulder extending from the body, wherein the body is coupled to the housing, the shoulder is configured to engage a channel in the meter roller, and a radial position of the shoulder is configured to establish a radial gap between the shoulder and flutes disposed within the channel sufficiently small to control flow of particulate material within the channel along a rotational direction of the meter roller.

10. The meter roller cartridge of claim 9, wherein the radial position of the shoulder is configured to establish the radial gap of less than or equal to 5 mm.

11. The meter roller cartridge of claim 9, wherein the body has a rounded edge at a longitudinal end of the body to facilitate flow of the particulate material from the meter roller to a passage.

12. The meter roller cartridge of claim 9, wherein a circumferential extent of the shoulder is selected to be greater than a circumferential offset between the flutes of the meter roller.

13. The meter roller cartridge of claim 9, wherein the housing has a substantially flat mounting surface, the body has a substantially flat mounting surface, and the substantially flat mounting surface of the body is configured to interface with the substantially flat mounting surface of the housing.

14. The meter roller cartridge of claim 9, wherein the housing has a discharge opening, and the body has a sloped surface configured to direct the particulate material toward the discharge opening.

15. The meter roller cartridge of claim 9, wherein the shoulder has an arcuate shape configured to follow the channel along a circumferential axis.

* * * * *